(12) United States Patent
Paolini-Subramanya et al.

(10) Patent No.: US 10,411,897 B2
(45) Date of Patent: Sep. 10, 2019

(54) SECRET SHARING VIA BLOCKCHAINS

(71) Applicant: Factom, Austin, TX (US)

(72) Inventors: Mahesh Paolini-Subramanya, Austin, TX (US); Brian Deery, Austin, TX (US); Paul Snow, Austin, TX (US)

(73) Assignee: Factom, Inc., Austin, TX (US)

(*) Notice: Subject to any disclaimer, the term of this patent is extended or adjusted under 35 U.S.C. 154(b) by 65 days.

(21) Appl. No.: 15/435,612

(22) Filed: Feb. 17, 2017

(65) Prior Publication Data

US 2018/0241565 A1    Aug. 23, 2018

(51) Int. Cl.
| | |
|---|---|
| *G06F 21/60* | (2013.01) |
| *H04L 9/32* | (2006.01) |
| *G06F 21/62* | (2013.01) |
| *H04L 9/06* | (2006.01) |
| *G06F 21/64* | (2013.01) |
| *H04L 9/08* | (2006.01) |
| *H04L 29/06* | (2006.01) |

(52) U.S. Cl.
CPC ............ *H04L 9/3239* (2013.01); *G06F 21/60* (2013.01); *G06F 21/6245* (2013.01); *G06F 21/64* (2013.01); *H04L 9/06* (2013.01); *H04L 9/0637* (2013.01); *H04L 9/085* (2013.01); *H04L 63/123* (2013.01); *H04L 2209/20* (2013.01); *H04L 2209/38* (2013.01)

(58) Field of Classification Search
CPC ......... H04L 67/108; H04L 9/085; H04L 9/06; H04L 9/0637; H04L 2209/20; G06F 21/00; G06F 21/60; G06F 21/6245
See application file for complete search history.

(56) References Cited

U.S. PATENT DOCUMENTS

| | | | |
|---|---|---|---|
| 4,309,569 | A | 6/1982 | Merkel |
| 5,499,294 | A | 3/1996 | Friedman |
| 5,862,218 | A | 1/1999 | Steinberg |
| 5,966,446 | A | 10/1999 | Davis |
| 7,272,179 | B2 | 9/2007 | Siemens et al. |
| 7,572,179 | B2 | 8/2009 | Choi et al. |
| 7,729,950 | B2 | 6/2010 | Mendizabal et al. |

(Continued)

FOREIGN PATENT DOCUMENTS

| | | |
|---|---|---|
| DE | 10128728 | 1/2003 |
| JP | 5383297 | 1/2014 |

(Continued)

OTHER PUBLICATIONS

Menezes, A.J., van oorschot, P.C. & Vanstone, S.A., Handbook of Applied Cryptography, 1997, CRC Press, p. 527-28.*

(Continued)

*Primary Examiner* — Daniel B Potratz
*Assistant Examiner* — D'Arcy Winston Straub
(74) *Attorney, Agent, or Firm* — Scott P. Zimmerman, PLLC

(57) ABSTRACT

Confidential, secret data may be shared via one or more blockchains. Mortgage applications, medical records, financial records, and other electronic documents often contain social security numbers, names, addresses, account information, and other personal data. A secret sharing algorithm is applied to any secret data to generate shares. The shares may then be integrated or written to one or more blockchains for distribution.

15 Claims, 12 Drawing Sheets

(56) References Cited

U.S. PATENT DOCUMENTS

| | | |
|---|---|---|
| 8,245,038 B2 | 8/2012 | Golle et al. |
| 8,266,439 B2 | 9/2012 | Haber et al. |
| 8,442,903 B2 | 5/2013 | Zadoorian et al. |
| 8,560,722 B2 | 10/2013 | Gates et al. |
| 8,706,616 B1 | 4/2014 | Flynn |
| 8,712,887 B2 | 4/2014 | DeGroeve et al. |
| 8,867,741 B2 | 10/2014 | McCorkindale et al. |
| 8,943,332 B2 | 1/2015 | Horne et al. |
| 9,124,423 B2 | 9/2015 | Jennas, II et al. |
| 9,396,006 B2 | 7/2016 | Kundu et al. |
| 9,407,431 B2 | 8/2016 | Bellare et al. |
| 9,411,524 B2 | 8/2016 | O'Hare et al. |
| 9,411,976 B2 | 8/2016 | Irvine |
| 9,411,982 B1 | 8/2016 | Dippenaar et al. |
| 9,424,576 B2 | 8/2016 | Vandervort |
| 9,436,935 B2 | 9/2016 | Hudon |
| 9,472,069 B2 | 10/2016 | Roskowski |
| 9,489,827 B2 | 11/2016 | Quinn et al. |
| 9,584,493 B1 | 2/2017 | Leavy et al. |
| 9,722,790 B2 | 8/2017 | Ebrahimi |
| 9,876,646 B2 | 1/2018 | Ebrahimi et al. |
| 9,882,918 B1 | 1/2018 | Ford et al. |
| 2003/0018563 A1 | 1/2003 | Kilgour et al. |
| 2004/0085445 A1 | 5/2004 | Park |
| 2005/0206741 A1 | 9/2005 | Raber |
| 2006/0075228 A1 | 4/2006 | Black et al. |
| 2006/0184443 A1 | 8/2006 | Erez et al. |
| 2007/0094272 A1 | 4/2007 | Yeh |
| 2007/0296817 A1 | 12/2007 | Ebrahimi et al. |
| 2008/0010466 A1 | 1/2008 | Hopper |
| 2009/0025063 A1 | 1/2009 | Thomas |
| 2009/0287597 A1 | 11/2009 | Bahar |
| 2010/0049966 A1 | 2/2010 | Kato |
| 2010/0058476 A1 | 3/2010 | Isoda |
| 2010/0161459 A1 | 6/2010 | Kass et al. |
| 2010/0241537 A1 | 9/2010 | Kass et al. |
| 2013/0142323 A1* | 6/2013 | Chiarella ............ H04L 63/0428 380/28 |
| 2013/0222587 A1 | 8/2013 | Roskowski |
| 2014/0229738 A1 | 8/2014 | Sato |
| 2014/0344015 A1 | 11/2014 | Puertolas-Montasnes et al. |
| 2015/0193633 A1* | 7/2015 | Chida ............ G06F 21/60 726/26 |
| 2015/0378627 A1* | 12/2015 | Kitazawa ............ G06F 21/6209 711/162 |
| 2016/0071096 A1 | 3/2016 | Rosca |
| 2016/0119134 A1 | 4/2016 | Hakoda et al. |
| 2016/0148198 A1 | 5/2016 | Kelley |
| 2016/0162897 A1 | 6/2016 | Feeney |
| 2016/0217436 A1 | 7/2016 | Brama |
| 2016/0253663 A1 | 9/2016 | Clark et al. |
| 2016/0260091 A1 | 9/2016 | Tobias |
| 2016/0267472 A1 | 9/2016 | Lingham et al. |
| 2016/0267558 A1 | 9/2016 | Bonnell et al. |
| 2016/0275294 A1 | 9/2016 | Irvine |
| 2016/0283920 A1 | 9/2016 | Fisher et al. |
| 2016/0292396 A1 | 10/2016 | Akerwall |
| 2016/0292672 A1 | 10/2016 | Fay et al. |
| 2016/0292680 A1 | 10/2016 | Wilson, Jr. et al. |
| 2016/0300200 A1 | 10/2016 | Brown et al. |
| 2016/0300234 A1 | 10/2016 | Moss-Pultz et al. |
| 2016/0321675 A1 | 11/2016 | McCoy et al. |
| 2016/0321751 A1 | 11/2016 | Creighton, IV et al. |
| 2016/0328791 A1 | 11/2016 | Parsells et al. |
| 2016/0330031 A1 | 11/2016 | Drego et al. |
| 2016/0330244 A1 | 11/2016 | Denton |
| 2016/0337119 A1 | 11/2016 | Hosaka et al. |
| 2016/0342977 A1 | 11/2016 | Lam |
| 2016/0342989 A1 | 11/2016 | Davis |
| 2016/0344737 A1 | 11/2016 | Anton et al. |
| 2017/0005797 A1 | 1/2017 | Lanc et al. |
| 2017/0053249 A1 | 2/2017 | Tunnell et al. |
| 2017/0061396 A1 | 3/2017 | Melika et al. |
| 2017/0124534 A1 | 5/2017 | Savolainen |
| 2017/0124535 A1 | 5/2017 | Juels et al. |
| 2017/0177898 A1 | 6/2017 | Dillenberger |
| 2017/0213287 A1 | 7/2017 | Bruno |
| 2017/0243208 A1 | 8/2017 | Kurian et al. |
| 2017/0243289 A1 | 8/2017 | Rufo |
| 2017/0244757 A1 | 8/2017 | Castinado et al. |
| 2017/0330279 A1 | 11/2017 | Ponzone |
| 2017/0352031 A1 | 12/2017 | Collin |
| 2017/0373859 A1 | 12/2017 | Shors et al. |
| 2018/0075527 A1 | 3/2018 | Nagla et al. |
| 2018/0091524 A1* | 3/2018 | Setty ............ H04L 63/12 |
| 2018/0097779 A1 | 4/2018 | Karame et al. |
| 2018/0157700 A1 | 6/2018 | Roberts et al. |

FOREIGN PATENT DOCUMENTS

| | | | |
|---|---|---|---|
| KR | 100653512 | 11/2006 | |
| KR | 101747221 | 6/2017 | |
| WO | WO 0049797 | 8/2000 | |
| WO | WO 2007069176 | 6/2007 | |
| WO | WO 2015077378 | 5/2015 | |
| WO | WO 2018013898 A1 | 1/2018 | |
| WO | WO-2018109010 A1 * | 6/2018 | ........... H04L 67/104 |

OTHER PUBLICATIONS

Alsolami, Fahad, and Terrance E. Boult. "CloudStash: using secret-sharing scheme to secure data, not keys, in multi-clouds." *Information Technology: New Generations (ITNG), 2014 11th International Conference on*. IEEE, 2014.

Watanabe, Hiroki, et al. "Blockchain contract: Securing a blockchain applied to smart contracts." *2016 IEEE International Conference on Consumer Electronics (ICCE)*. IEEE. 2016.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Crosby, Michael et al., "BlockChain Technology, Beyond Bitcoin", Sutardja Center for Entrepreneurship & Technology, Berkeley Engineering, Oct. 16, 2015, 35 pages.

Al-Naji, Nader et al., "Basis: A Price-Stable Cryptocurrency with an Algorithmic Central Bank" www.basis.io Jun. 20, 2017, 27 pages.

Unknown, Xtrade White Paper, https://xtrade1-9649.kxcdn.com/wp-content/uploads/2017/09/xtrade-whitepaper.pdf Feb. 7, 2018, 37 pages.

Chakravorty, Antorweep, and Chunming Rong, "Ushare: user controlled social media based on blockchain." *Proceedings of the 11th International Conference on Ubiquitous Information Management and Communication*. ACM, 2017.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.

\* cited by examiner

US 10,411,897 B2

SECRET SHARING VIA BLOCKCHAINS

CROSS-REFERENCE TO RELATED APPLICATIONS

This application relates to U.S. application Ser. No. 15/419,033 filed Jan. 30, 2017 and to U.S. application Ser. No. 15/419,042 also filed Jan. 30, 2017, with both applications incorporated herein by reference in their entireties.

BACKGROUND

Security is important in today's online environment. One reads nearly every day of another hacking. People's data is even being held ransom.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
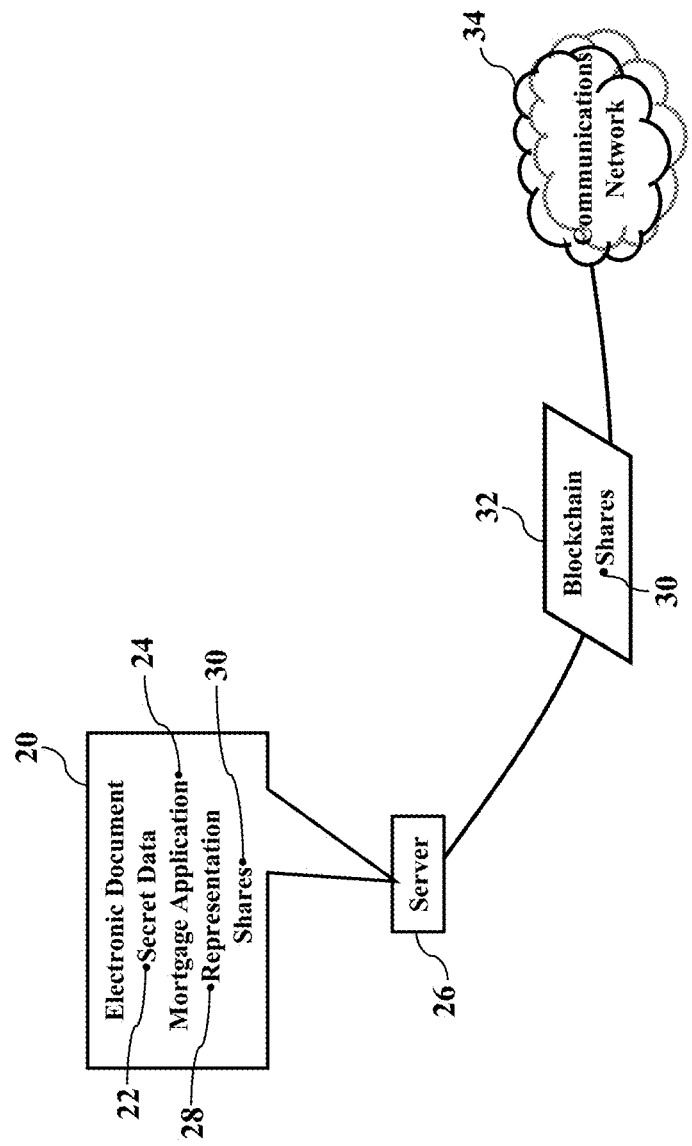
FIGS. 1-3 are simplified illustrations for secretly sharing an electronic document, according to exemplary embodiments.
Figure 2:
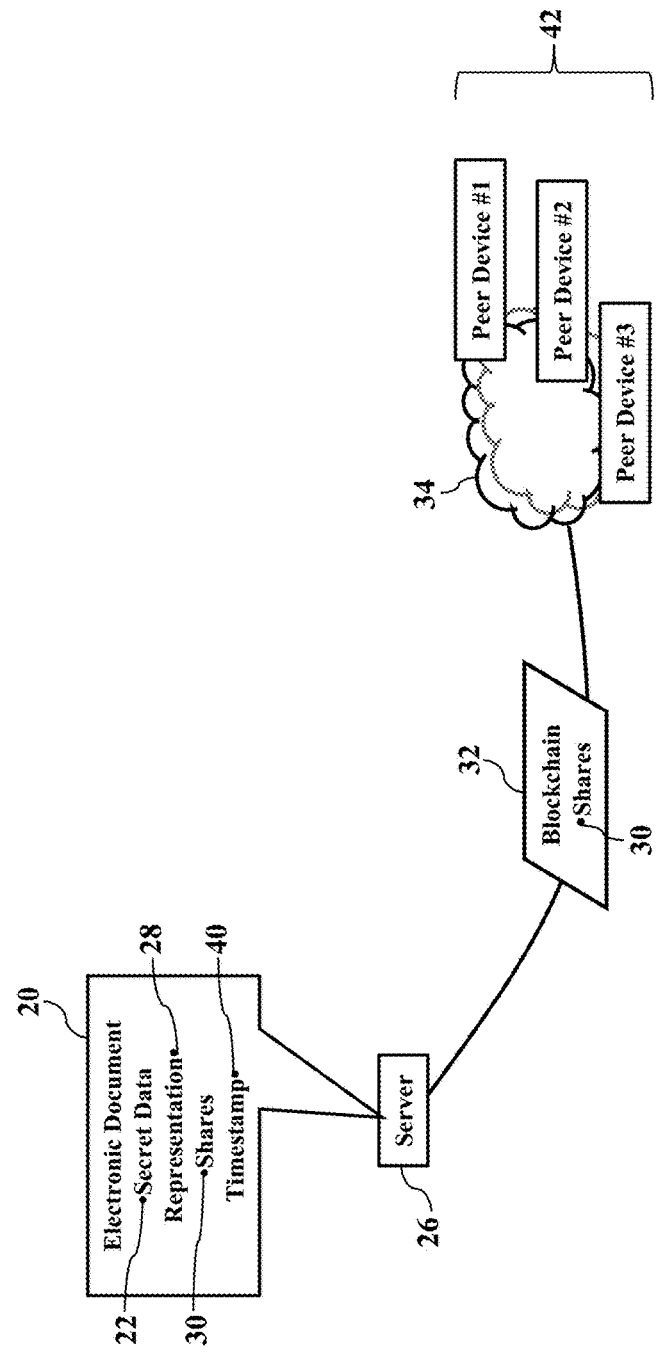
Figure 3:
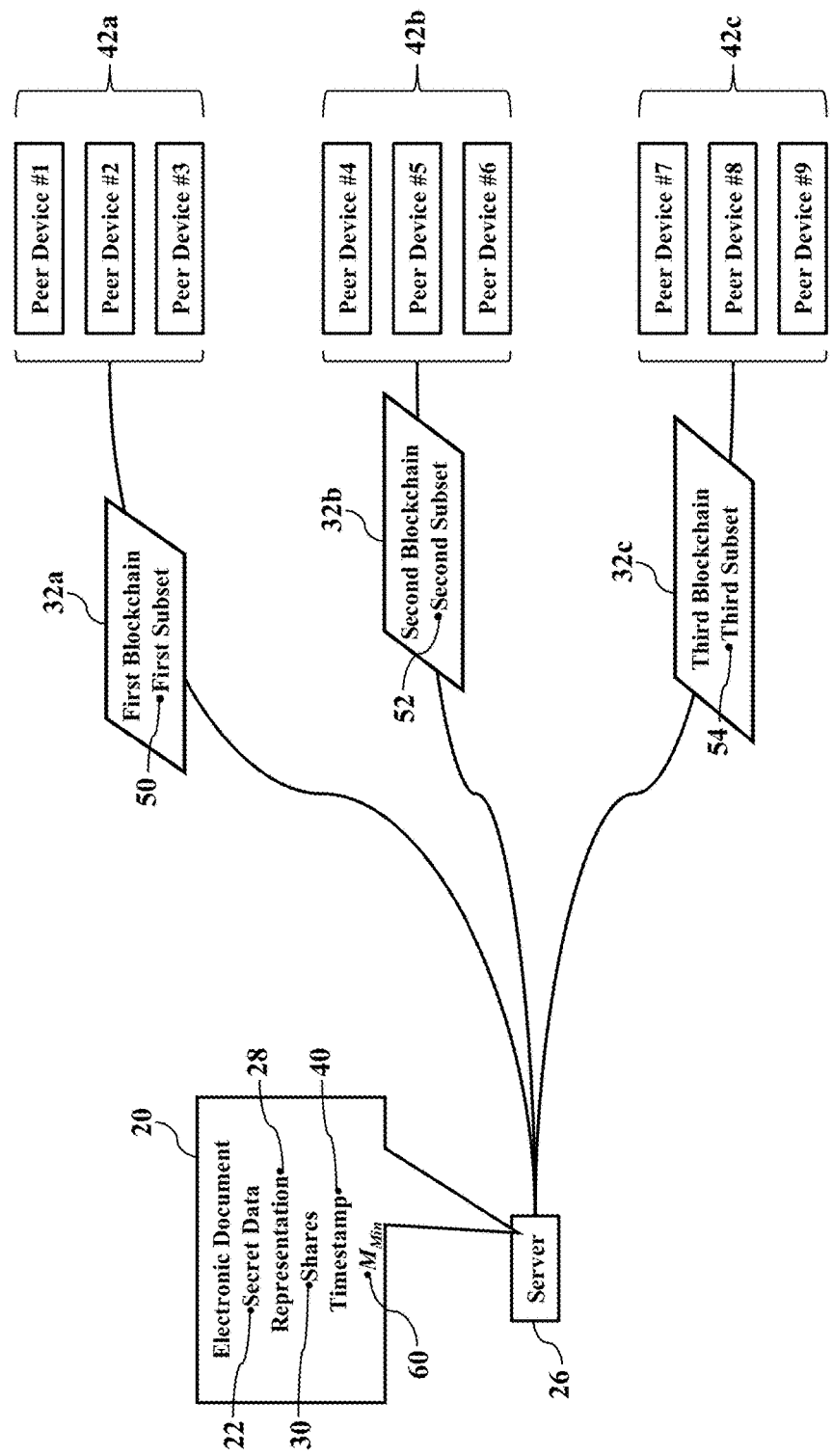

FIGS. 1-3 are simplified illustrations for secretly sharing an electronic document 20, according to exemplary embodiments. The electronic document 20 contains sensitive information, such as a user's social security number, income, banking, and other personal information. The electronic document 20, in plain words, contains secret data 22. While the electronic document 20 may have any content, most readers are thought familiar with a mortgage application 24. That is, the electronic document 20 may be a web-based, portable document format (PDF) associated with an applicant's personal and financial records for obtaining a mortgage. As the reader understands, the mortgage application 24 includes the secret data 22, such as an applicant's social security number, income, and banking records. If the mortgage application 24 were to fall into the wrong hands, the secret data 22 may be nefariously used by a rogue entity.

Exemplary embodiments thus protect the secret data 22. A server 26 retrieves a representation 28 of the electronic document 20 and splits the representation 28 into multiple pieces termed shares 30. The server 26 may then distribute one or more of the shares 30 via a blockchain 32. As the reader may understand, the blockchain 32 is generally a digital ledger in which transactions are chronologically and/or publically recorded. The blockchain 32 is most commonly used in decentralized cryptocurrencies (such as Bitcoin). The blockchain 32, however, may be adapted to any chain or custody (such as in medical records and in chains of title in real estate transactions). Indeed, there are many different mechanisms and configurations of the blockchain 32, and exemplary embodiments may be adapted to any version. Regardless, the shares 30 may be integrated into the blockchain 32 as a distribution or publication mechanism. The blockchain 32 may then route via a communications network 34 to any destination.

FIG. 2 illustrates secret sharing. Once the representation 28 of the electronic document 20 is split into the multiple shares 30, the server 26 may integrate any one or more of the shares 30 into the blockchain 32, perhaps with a timestamp 40. While the blockchain 32 may be sent or routed to any destination (such as an Internet Protocol address associated with another server or device), FIG. 2 illustrates peer distribution. That is, the server 26 may broadcast the blockchain 32 to the IP addresses associated with a group 42 of peer devices or nodes. The blockchain 32, in other words, is distributed to trusted peers for further processing and/or verification.

FIG. 3 further illustrates secret sharing. Here the server 26 may integrate any one or more of the shares 30 into multiple blockchains 32. While exemplary embodiments may utilize any number of different blockchains 32, FIG. 3 illustrates a simple example of three (3) blockchains 32a-c distributed to three (3) different groups 42a-c of peer devices. That is, some of the shares 30 (such as a first subset 50) are integrated into a first blockchain 32a and distributed (via the communications network 34 illustrated in FIGS. 1-2) to a first group 42a of peer devices. A second subset 52 of the shares 30 are integrated into a second blockchain 32b and distributed to a second group 42b of peer devices. Still more shares 30 (such as the remaining portion or pieces in a third subset 54) are integrated into a third blockchain 32c and distributed to a third group 42c of peer devices. Different collections of the shares 30, in other words, may be distributed via different blockchains 32 to different peer devices.

Exemplary embodiments may thus stash the secret data 22 in the multiple blockchains 32a-c. Because the electronic document 20 (containing the secret data 22) is split into the multiple shares 30, any one or more of the peer devices must possess a sufficient minimum number $M_{Min}$ (illustrated as reference numeral 60) of the shares 30 before the secret data 22 may be recovered. That is, possession of an insufficient number of the shares 30 guarantees that the secret data 22 remains unknown and confidential. So, if the first blockchain 32a contains less than the $M_{Min}$ 60 of the total shares 30, then the first group 42a of peer devices cannot reconstruct the secret data 22. Likewise, if the second blockchain 32b and/or the third blockchain 32c also contains less than the $M_{Min}$ 30, the second group 42b of peer devices and the third group 42c of peer devices are also unable to reveal or decipher the secret data 22. In other words, no single one of the multiple blockchains 32a-c stores the requisite minimum number $M_{Min}$ 60 of the shares 30 to launch a brute-force attack on the secret data 22. Even multiple ones of the blockchains 32a-c may be purposefully designed to never exceed the requisite minimum number $M_{Min}$ 60 of the shares 30, perhaps thus forcing a hacker to compromise several or all of the blockchains 32a-c. A rogue attack, in simple words, would have to access and compromise multiple blockchains 32 before jeopardizing the secret data 22 contained within the electronic document 20.

Exemplary embodiments thus present an elegant solution. Sensitive, secret documents (containing the secret data 22) may be secretly shared via the one or more blockchains 32a-c. Even if the blockchains 32a-c are dispersed to trusted peer devices, the peer devices still cannot discern the secret data 22 until the threshold minimum number $M_{Min}$ 60 of the shares 30 is obtained. Exemplary embodiments thus purposefully add a second-layer of protection, beyond merely trusted receipt of the blockchain 32. The trusted peers simply do not have access to the secret data 22 until the minimum number $M_{Min}$ 60 of the shares 30 is obtained.

Any secret sharing scheme may be utilized. The reader is perhaps familiar with Shamir's Secret Sharing Algorithm, which is a well-known cryptographic algorithm. Exemplary embodiments divide the secret data 22 into unique parts (e.g., the shares 30), with each individual share 30 being different from other shares 30. However, there are many secret sharing or splitting schemes and algorithms for distributing a secret, and exemplary embodiments may be applied regardless of any particular scheme or algorithm.

Figure 4:
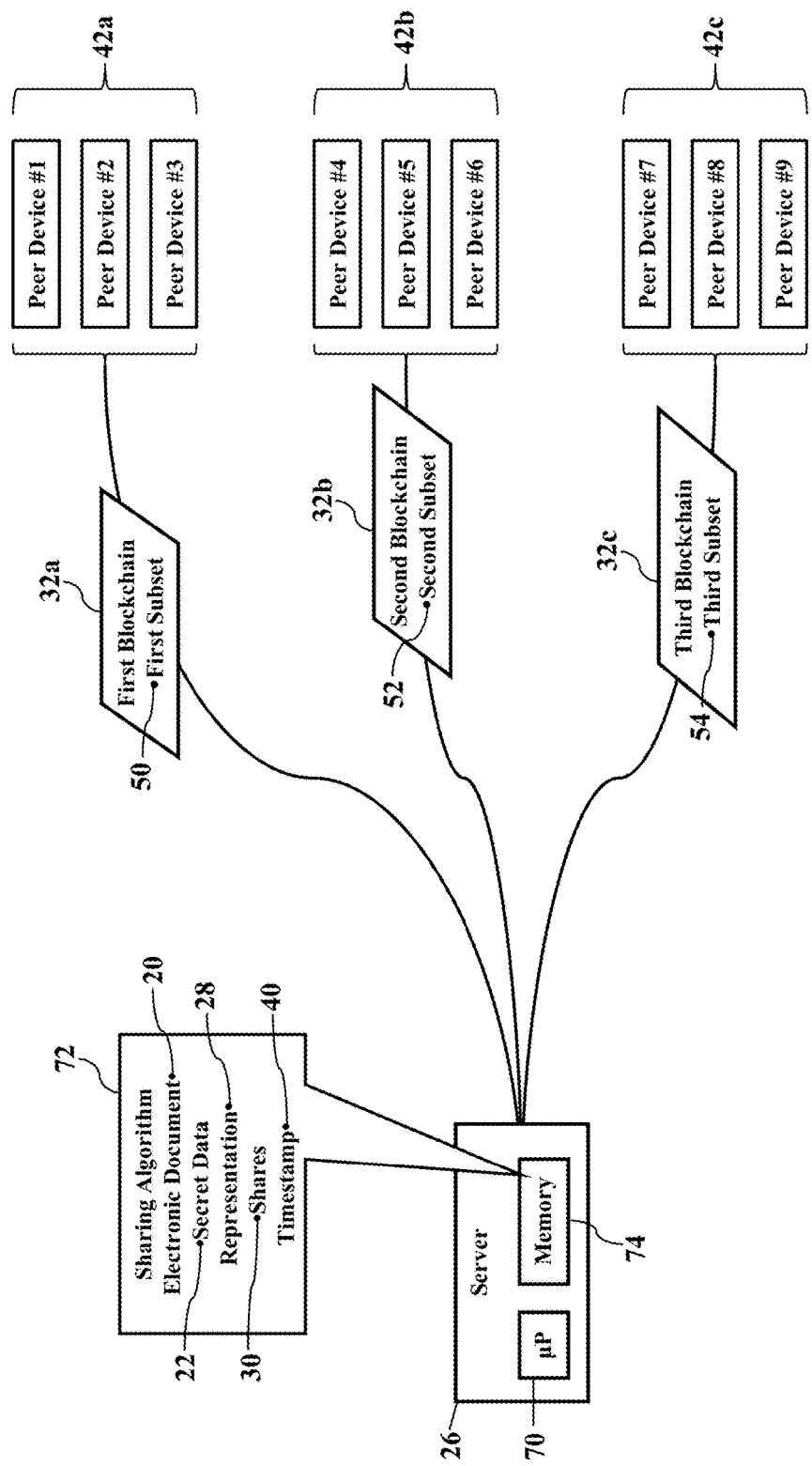
FIG. 4 is a detailed illustration of an operating environment, according to exemplary embodiments.

FIG. 4 is a detailed illustration of an operating environment, according to exemplary embodiments. Here the server 26 secretly shares the electronic document 20 via the one or more blockchains 32. The server 26 may have a processor 70 (e.g., "µP"), application specific integrated circuit (ASIC), or other component that executes an electronic representation of a sharing algorithm 72 stored in a local memory device 74. The sharing algorithm 72 includes instructions, code, and/or programs that cause the server 26 to perform operations, such as splitting or segmenting the representation 28 of the electronic document 20 into the multiple shares 30. The sharing algorithm 72 may then select one or more of the shares 30 (such as the first subset 50) for integration into the first blockchain 32a. The sharing algorithm 72 may then select other ones of the shares 30 (such as the second subset 52) for integration into the second blockchain 32b. The sharing algorithm 72 may then integrate any remaining, unselected ones of the shares 30 (such as the third subset 54) for integration into the third blockchain 32c. The sharing algorithm 72 may also add the timestamp 40 to each blockchain 32a-c. After different collections of the shares 30 are integrated into the different blockchains 32a-c, the blockchains 32a-c are distributed to their respective destinations (such as Internet Protocol addresses associated with the first group 42a of peer devices, the second group 42b of peer devices, and the third group 42c of peer devices).

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may packetize. The server 26 and the recipient peer devices may have network interfaces to the communications network 34, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

Figure 5:
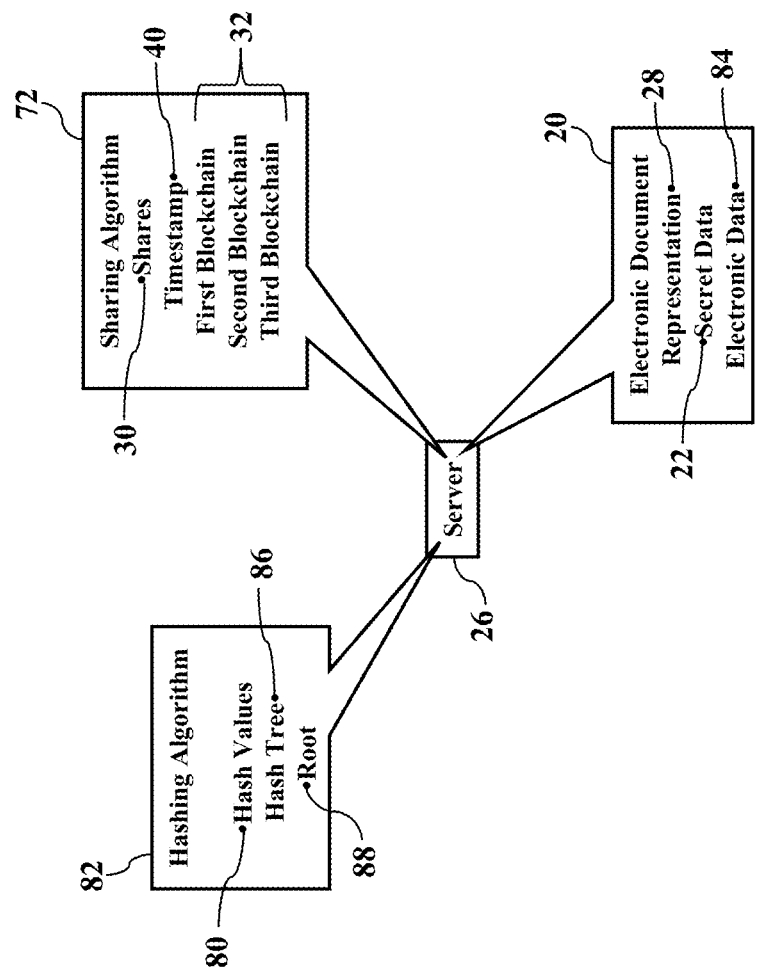
FIGS. 5-6 illustrate hashing, according to exemplary embodiments.
Figure 6:
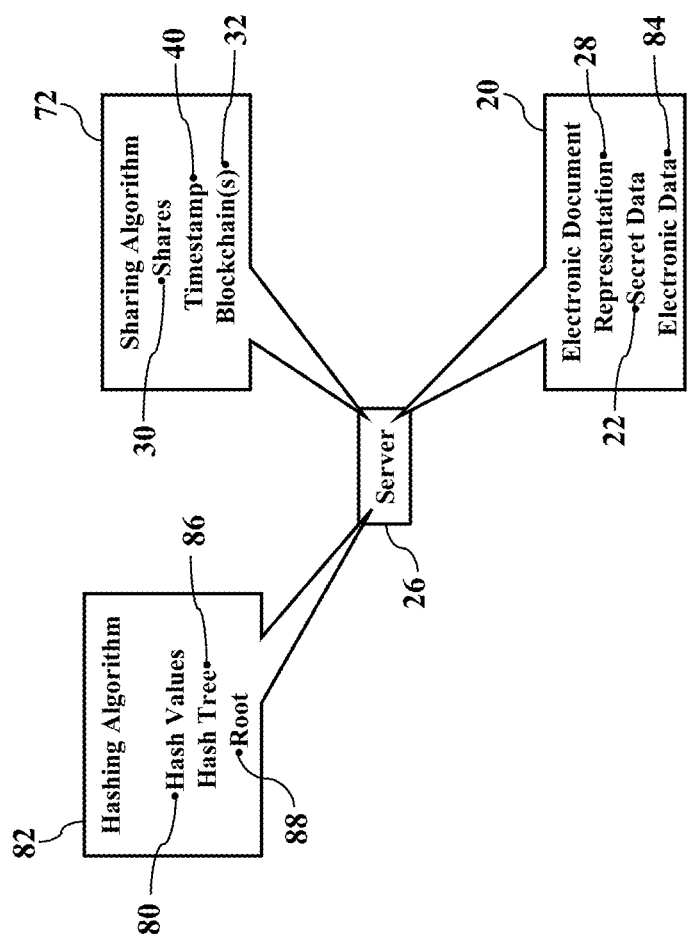

FIGS. 5-6 illustrate hashing, according to exemplary embodiments. When the server 26 retrieves the representation 28 of the electronic document 20, here the representation 28 may be one or more hash values 80. That is, the server 26 may call or invoke an electronic representation of a hashing algorithm 82 that hashes electronic data 84 representing or associated with the electronic document 20 to generate the hash values 80. The hash values 80 may be associated with a hash tree 86 and/or root 88. The sharing algorithm 72 may then retrieve and split the hash values 80 into the multiple shares 30. The sharing algorithm 72 may then group or collect different ones of the shares 30 for integration into the one or more blockchains 32 (as this disclosure earlier explained). The blockchains 32 are then distributed to their respective destinations (again as this disclosure earlier explained). Exemplary embodiments may thus first hash the electronic document 20, create the shares 30 from the hash values 80, and then integrate the shares 30 into the blockchain(s) 32.

Hashing adds another layer of security. Exemplary embodiments may call or execute the hashing algorithm 82 that generates the hash values 80 (e.g., the hash tree 86 and the root 88) associated with the electronic document 20. There are many hashing algorithms, and exemplary embodiments may utilize any of the hashing algorithms. For example, many readers may be familiar with the SHA family of cryptographic hashing algorithms. Moreover, the hash tree 86 may be described as the Merkle tree, which many readers are also thought familiar. Regardless, once the hash values 80 are determined, exemplary embodiments may split the hash values 80 into the shares 30 for integration into the one or more blockchains 32. That is, the shares 30 may be added to, or incorporated in, any record, transaction, or block and distributed via the blockchain(s) 32.

FIG. 6 illustrates an alternative hashing strategy. Here the server 26 may call or invoke the sharing algorithm 72 to split the electronic data 84 associated with the electronic document 20 into the multiple shares 30. The server 26 may then apply the hashing algorithm 82 to the shares 30 to generate the hash values 80. The hash values 80 may then be integrated into the one or more blockchains 32 for distribution. Exemplary embodiments may thus first create the shares 30 from the electronic data 84, hash the shares 30, and then integrate the hash values 80 into the blockchain(s) 32.

Figure 7:
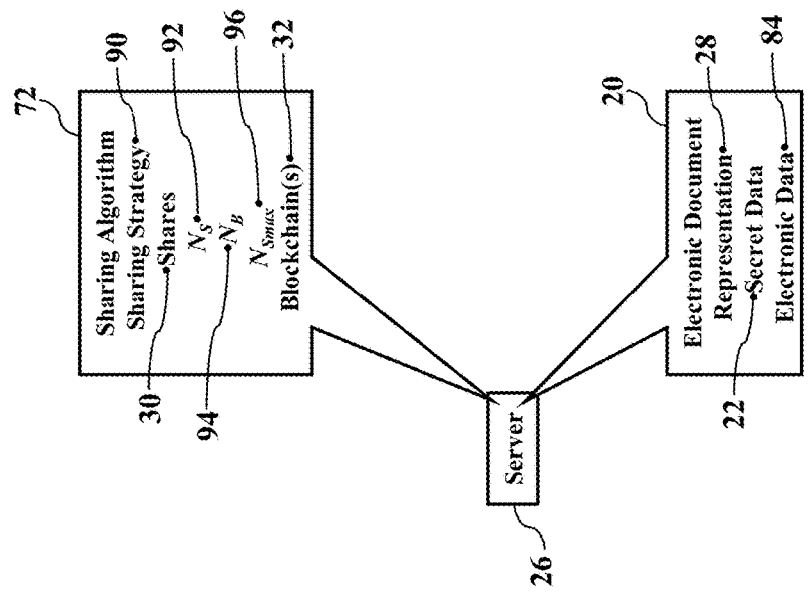
FIGS. 7-8 illustrate a sharing strategy, according to exemplary embodiments.
Figure 8:
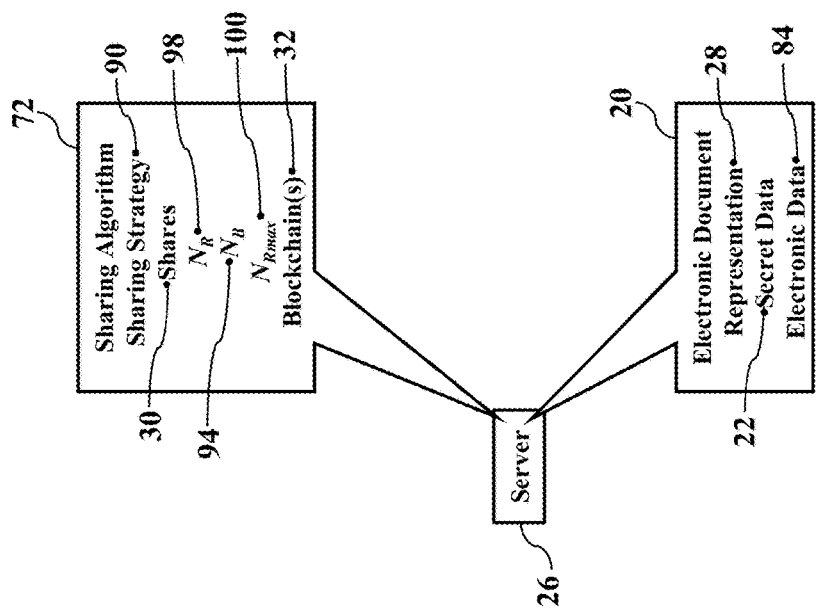

FIGS. 7-8 illustrate a sharing strategy 90, according to exemplary embodiments. Here the sharing algorithm 72 may retrieve and implement the sharing strategy 90 that defines distribution via the multiple blockchains 32a-c to protect the secret data 22. Suppose, for example, that the total number $N_S$ (illustrated as reference numeral 92) of the shares 30 defines a number $N_B$ (illustrated as reference numeral 94) of the different blockchains 32. The total number $N_S$ 92 of the shares 30, in other words, may relate by a ratio to the number $N_B$ 94 of blockchains 32 that must be used. As a simple example, the ratio may be $$\frac{N_S}{N_B} = 10,000,$$

where the total number $N_S$ 92 of the shares 30 is ten thousand (10,000) times the number $N_B$ 94 of blockchains 32 that must be used. Again, as a simple example, if the electronic document 20 is associated with one million (1,000,000) shares 30, then one hundred (100) different blockchains 32 must be generated and distributed. The sharing strategy 90, in other words, may set a maximum number $N_{Smax}$ (illustrated as reference numeral 96) of shares 30 integrated into any single blockchain 32. The sharing strategy 90, in other words, may thus limit the number of the shares 30 exposed by any individual blockchain 32.

FIG. 8 further illustrates the sharing strategy 90. Here, though, the number $N_B$ 94 of blockchains may be based on the number of recipients. That is, the total number $N_R$ (illustrated as reference numeral 98) of the recipients may define the number $N_B$ 94 of the different blockchains 32. The greater the recipients, in other words, then the greater the $N_B$ 94 of blockchains 32 that must be used. Again, suppose that the sharing strategy 90 may again be defined as the ratio $$\frac{N_R}{N_B} = 100,$$

where the total number $N_R$ 98 of the recipients is one hundred (100) times the number $N_B$ 94 of blockchains 32 that must be used. Again, as a simple example, if there are ten thousand recipients, then one hundred (100) different blockchains 32 must be generated and distributed. The sharing strategy 90, in other words, may set a maximum number $N_{Rmax}$ (illustrated as reference numeral 100) of recipients per blockchain 32. The sharing strategy 90, in other words, may thus limit the number of the shares 30 exposed by any individual blockchain 32.

The sharing strategy 90 may be implemented as logical rules. If the sharing strategy 90 is mathematically defined (such as the ratio above discussed), the sharing strategy 90 may be expressed as logical statements involving mathematical expressions. Exemplary embodiments may code or program the sharing strategy 90 to achieve policy goals and/or security objectives.

Figure 9:
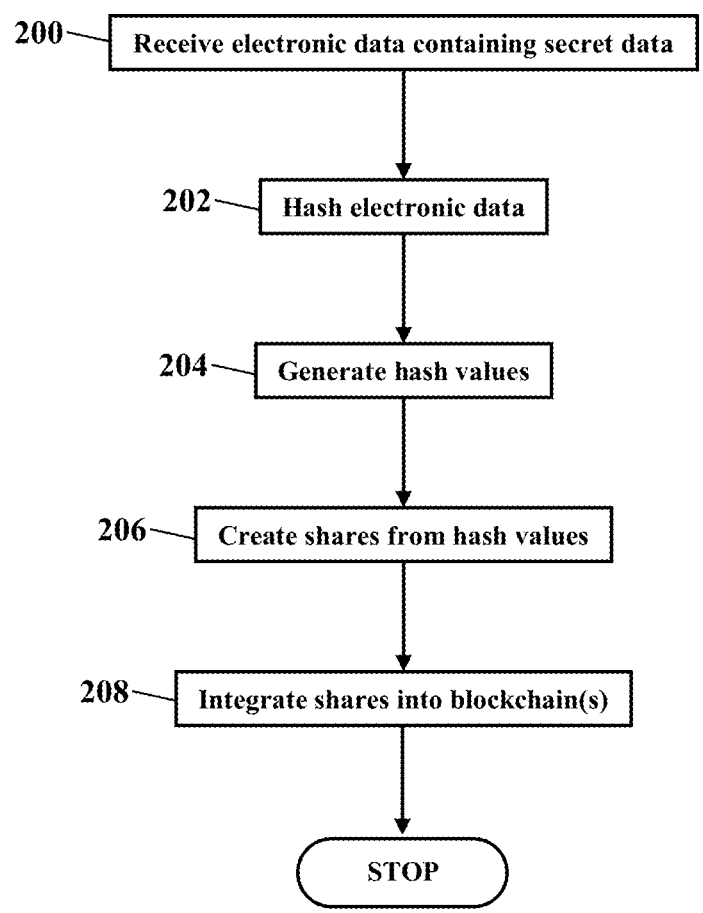
FIGS. 9-10 are flowcharts illustrating methods or algorithms for secret sharing via blockchain(s), according to exemplary embodiments.

FIG. 9 is a flowchart illustrating a method or algorithm for secret sharing via the blockchain(s) 32, according to exemplary embodiments. The electronic data 84 representing the electronic document 20 is received (Block 200). The electronic data 84 is hashed using the hashing algorithm 82 (Block 202) to generate the hash values 80 (Block 204). The shares are created from the hash values 80 (Block 206). The shares 30 are integrated into the one or more blockchains 32 (Block 208).

Figure 10:
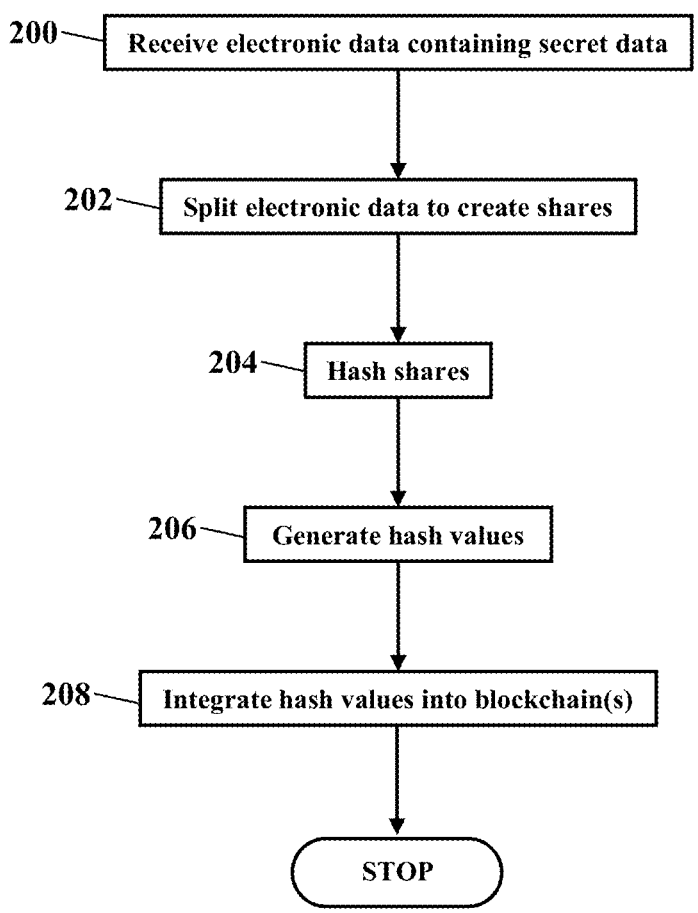

FIG. 10 is another flowchart illustrating a method or algorithm for secret sharing via the blockchain(s) 32, according to exemplary embodiments. The electronic data 84 representing the electronic document 20 is received (Block 200). The electronic data 84 is split to create the shares 30 (Block 202). The shares 30 are hashed using the hashing algorithm 82 (Block 204) to generate the hash values 80 (Block 206). The hash values 80 are integrated into the one or more blockchains 32 (Block 208).

Figure 11:
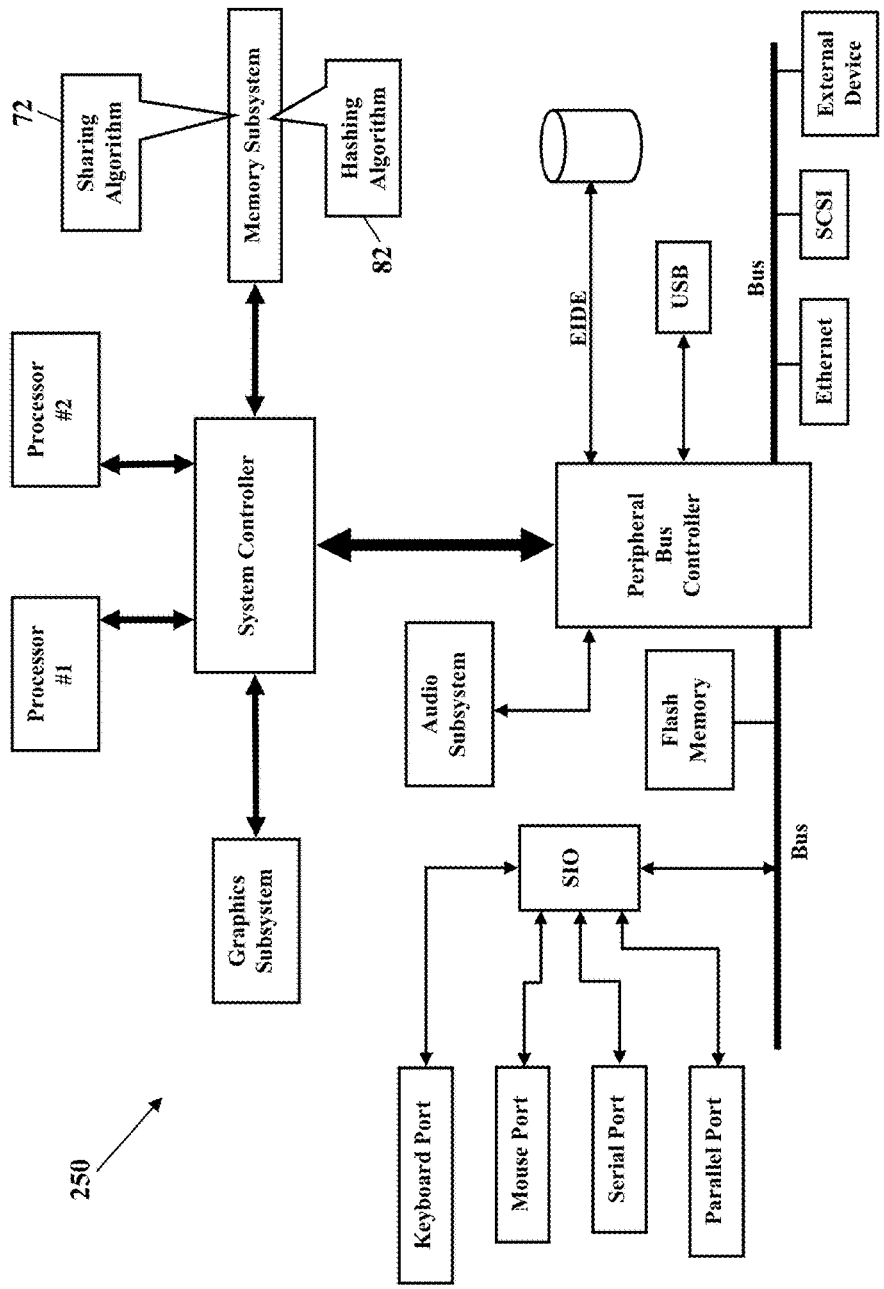
FIGS. 11-12 depict still more operating environments for additional aspects of the exemplary embodiments.

FIG. 11 is a schematic illustrating still more exemplary embodiments. FIG. 11 is a more detailed diagram illustrating a processor-controlled device 250. As earlier paragraphs explained, the sharing algorithm 72 and the hashing algorithm 82 may partially or entirely operate in any mobile or stationary processor-controlled device. FIG. 11, then, illustrates the sharing algorithm 72 and the hashing algorithm 82 stored in a memory subsystem of the processor-controlled device 250. One or more processors communicate with the memory subsystem and execute either, some, or all applications. Because the processor-controlled device 250 is well known to those of ordinary skill in the art, no further explanation is needed.

Figure 12:
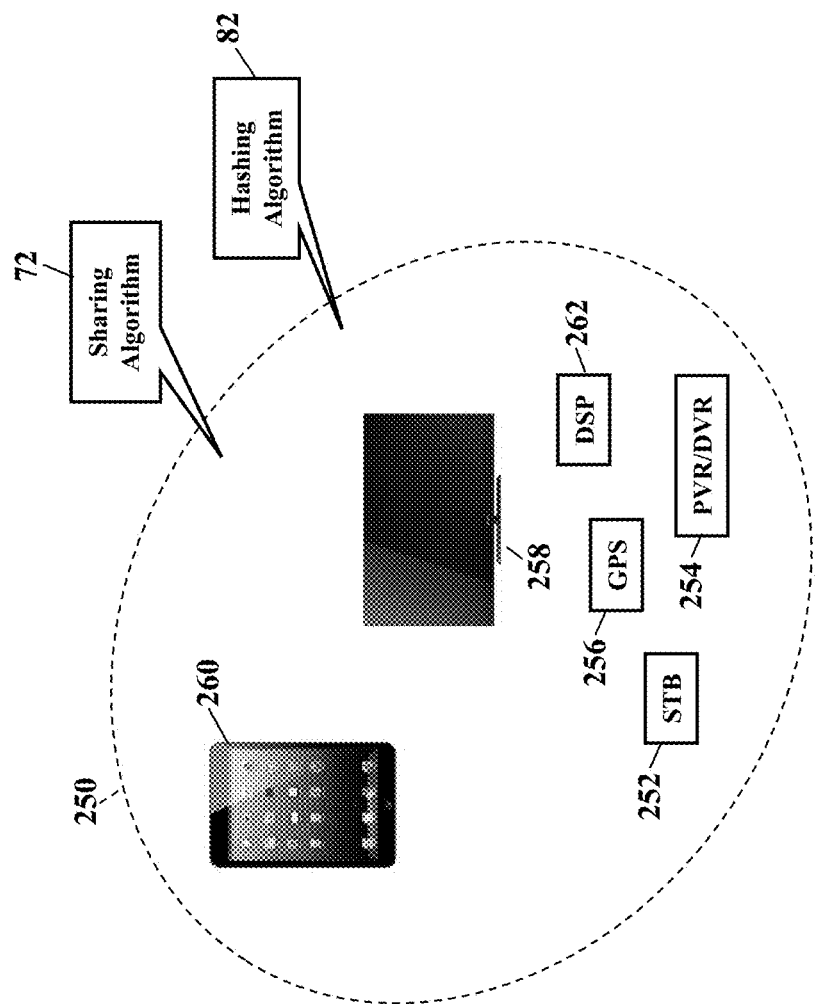

FIG. 12 depicts other possible operating environments for additional aspects of the exemplary embodiments. FIG. 12 illustrates the sharing algorithm 72 and the hashing algorithm 82 operating within various other processor-controlled devices 250. FIG. 12, for example, illustrates that the sharing algorithm 72 and the hashing algorithm 82 may entirely or partially operate within a set-top box ("STB") (252), a personal/digital video recorder (PVR/DVR) 254, a Global Positioning System (GPS) device 256, an interactive television 258, a tablet computer 260, or any computer system, communications device, or processor-controlled device utilizing any of the processors above described and/or a digital signal processor (DP/DSP) 262. Moreover, the processor-controlled device 250 may also include wearable devices (such as watches), radios, vehicle electronics, clocks, printers, gateways, mobile/implantable medical devices, and other apparatuses and systems. Because the architecture and operating principles of the various devices 250 are well known, the hardware and software componentry of the various devices 250 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for sharing secrets via blockchains, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
retrieving, by a hardware processor, an electronic document having a portable document format representing a mortgage application including secret data;
splitting, by the hardware processor, the electronic document having the portable document format representing the mortgage application including the secret data into multiple shares via an electronic representation of a secret sharing algorithm;
generating, by the hardware processor, hash values representing the multiple shares, each hash value of the hash values generated by hashing a corresponding individual share of the multiple shares using an electronic representation of a hashing algorithm;
determining, by the hardware processor, a number $N_R$ of trusted peer devices as recipients of different blockchains;
determining, by the hardware processor, a number $N_B$ of the different blockchains based on the number $N_R$ of the trusted peer devices as the recipients according to a ratio of $N_R/N_B$ having a maximum value;
integrating, by the hardware processor, the hash values representing the multiple shares of the electronic document into the different blockchains; and
publishing, by the hardware processor, the different blockchains via the Internet to distribute the hash values representing the multiple shares of the electronic document having the portable document format representing the mortgage application including the secret data.

2. The method of claim 1, further comprising timestamping any of the multiple shares.

3. The method of claim 1, further comprising timestamping any of the hash values.

4. The method of claim 1, further comprising broadcasting the different blockchains to the trusted peer devices.

5. The method of claim 1, further comprising integrating a subset of the multiple shares into one of the multiple blockchains.

6. The method of claim 1, further comprising distributing a subset of the hash values to a group of the trusted peer devices.

7. A system, comprising:
a hardware processor; and
a memory device, the memory device storing instructions, the instructions when executed causing the hardware processor to perform operations, the operations comprising:
retrieving an electronic document having a portable document format representing a mortgage application containing secret data;
splitting the electronic document having the portable document format representing the mortgage application containing the secret data into multiple shares via a secret sharing algorithm;
generating hash values representing the multiple shares, each hash value of the hash values generated by hashing a corresponding individual share of the multiple shares using an electronic representation of a hashing algorithm;
determining a number $N_R$ of trusted peer devices as recipients of different blockchains;
determining a number $N_B$ of the different blockchains based on the number $N_R$ of the trusted peer devices as the recipients according to a ratio of $N_R/N_B$ having a maximum value;
integrating the hash values representing the multiple shares into the different blockchains; and
publishing the different blockchains via the Internet to distribute the hash values representing the multiple shares of the electronic document having the portable document format representing the mortgage application containing the secret data.

8. The system of claim 7, wherein the operations further comprise timestamping any of the multiple shares.

9. The system of claim 7, wherein the operations further comprise timestamping any of the hash values.

10. The system of claim 7, wherein the operations further comprise broadcasting the different blockchains to the trusted peer devices.

11. The system of claim 7, wherein the operations further comprise broadcasting any of the different blockchains to any of the trusted peer devices.

12. A memory device storing instructions that when executed cause a hardware processor to perform operations, the operations comprising:

retrieving an electronic document having a portable document format representing a mortgage application including secret data;

splitting the electronic document having the portable document format representing the mortgage application including the secret data into multiple shares via a secret sharing algorithm;

generating hash values representing the multiple shares, each hash value of the hash values generated by hashing a corresponding individual share of the multiple shares using an electronic representation of a hashing algorithm;

determining a number $N_R$ of trusted peer devices as recipients of different blockchains;

determining a number $N_B$ of the different blockchains based on the number $N_R$ of the trusted peer devices as the recipients according to a ratio of $N_R/N_B$ having a maximum value;

integrating the hash values representing the multiple shares into the different blockchains; and publishing the different blockchains via the Internet to distribute the hash values representing the multiple shares of the electronic document having the portable document format representing the mortgage application including the secret data.

13. The memory device of claim 12, wherein the operations further comprise determining a ratio that defines a maximum number of the hash values exposed by an individual blockchain of the different blockchains.

14. The memory device of claim 12, wherein the operations further comprise determining a number $N_S$ of the multiple shares.

15. The memory device of claim 14, wherein the operations further comprise determining the number $N_B$ of the different blockchains based on the number $N_S$ of the multiple shares according to a ratio of $N_S/N_B$.

* * * * *